United States Patent Office 3,018,124
Patented Jan. 23, 1962

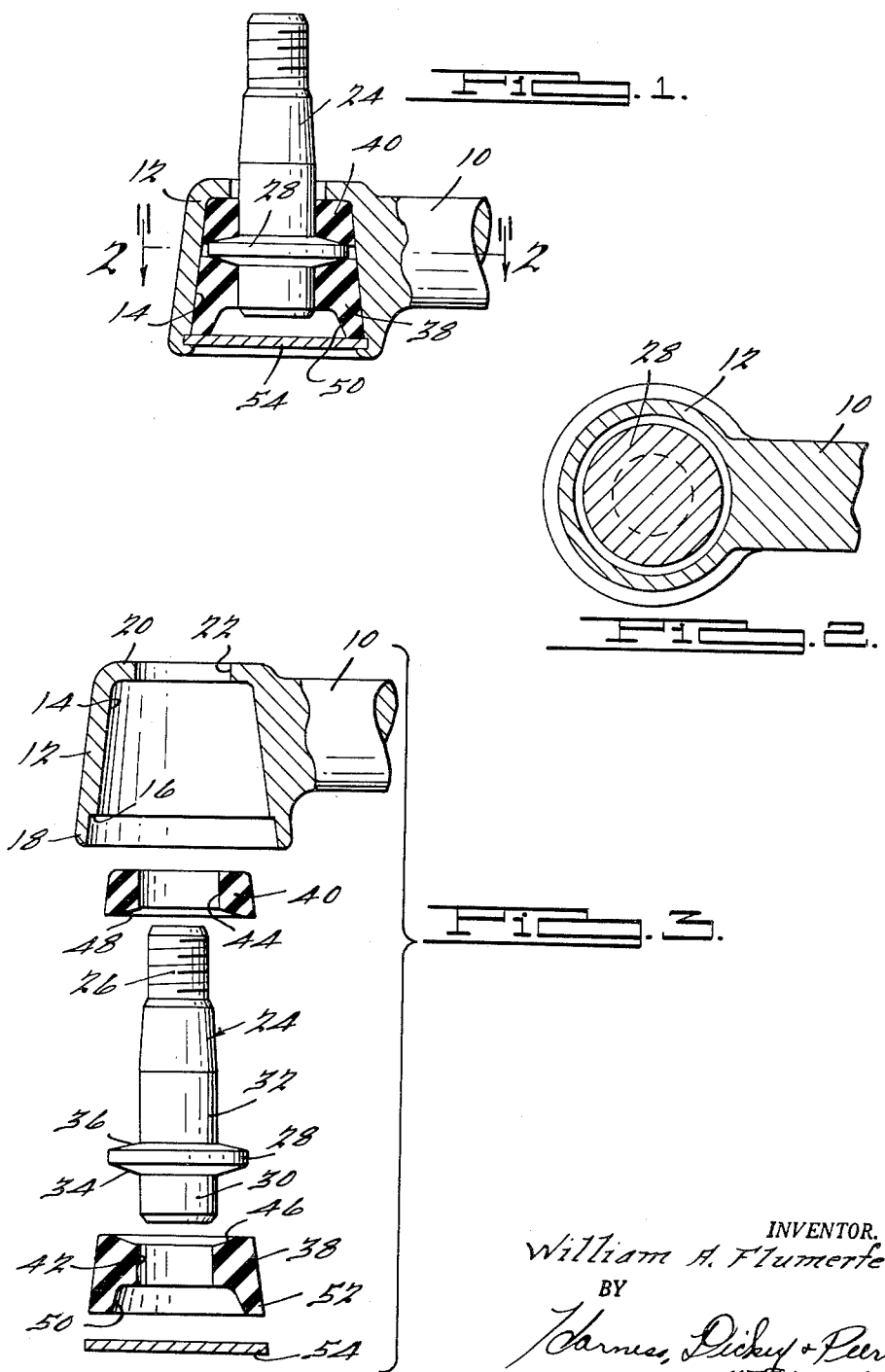

3,018,124
RESILIENT STEERING LINKAGE CONNECTOR
William A. Flumerfelt, Columbus, Ohio, assignor to The Columbus Auto Parts Company, Columbus, Ohio, a corporation of Ohio
Filed Mar. 4, 1960, Ser. No. 12,805
7 Claims. (Cl. 287—85)

This invention relates to joint constructions and, particularly, to a joint having a stud for use in automotive steering linkages or the like.

It is an object of the present invention to provide a permanently lubricated or greaseless resilient connecting joint in which a stud is mounted within a housing member for rotative and limited angular or tilting movement.

It is another object of the present invention to provide a joint of the above character comprising a minimum of separate parts, which may be easily assembled and which may be otherwise inexpensively fabricated.

It is another object of the present invention to provide a joint construction of the above character in which the housing member and other parts may be manufactured according to relatively liberal dimensional tolerances and wherein the bearing members utilized in the assembly are so constructed as to automatically accommodate themselves to variations in said dimensions.

It is another object of the present invention to provide a joint construction having bearing means operable to firmly and positively support the stud within the housing and having automatic wear compensating means for maintaining tightness of fit of the various parts over a long period of use.

It is still another object of the present invention to provide a joint construction of the above character having resilient bearing means which is effective to uniformly resist excessive angular or tilting movement of the stud, yet which is operable to absorb substantial shocks and undesirable noises.

Other objects and advantages of the present invention will become apparent from the following detailed description taken in conjunction with the accompanying drawings, wherein:

FIGURE 1 is a view, partly in vertical section and partly in elevation, of a joint embodying the principles of the present invention;

FIG. 2 is a sectional view of the structure illustrated in FIG. 1, taken along the line 2—2 thereof; and FIG. 3 is an exploded view of the parts illustrated in FIG. 1, showing the condition of said parts prior to assembly.

Referring now to the drawings, the joint of the present invention is illustrated as being formed on the end of a relay rod 10. The rod 10 is provided with a housing portion 12, which has a frusto-conical cavity 14. The large open lower end of the cavity 14 is formed with a shoulder 16 adjacent thereto and with a depending lip 18 surrounding the shoulder 16. The upper end of the cavity 14 is formed with an end wall or shoulder portion 20 having a large central aperture 22 therethrough.

The housing 12 serves as a support and mounting for a stud 24 having a threaded extremity 26 at one end thereof adapted to receive a nut (not shown) or other fastener. An enlarged, radially outwardly extending flange 28 is formed adjacent the opposite end of the stud 24 with a lower shank portion 30 formed on one side of the flange 28 and a central shank portion 32 disposed on the opposite side of the flange 28. The flange 28 is formed with a pair of lower and upper faces 34 and 36 which are of a rather flat, frusto-conical configuration. That is, the opposite flange faces 34 and 36 lie on radially outwardly converging planes, and the flange is thus thicker adjacent the shank of the stud than it is at its outer edge.

The stud 24 extends upwardly through the aperture 22 to position the threaded extremity 26 above the housing 12. The stud flange 28 is located generally centrally of the cavity 14 and extends laterally relative to the axis of the cavity 14. Support for the stud 24 is provided by means of a pair of lower and upper bearing members 38 and 40, which are disposed on opposite sides of the flange 28. The bearings 38 and 40 are both of generally annular shape, each has a frusto-conical outer periphery and they are provided with large central openings 42 and 44, conforming to the diameters of the lower and central shank portions 30 and 32, respectively. The bearing 38 is provided with an upwardly facing frusto-conical bearing seat 46 engageable with the lower flange face 34, while the bearing 40 is provided with a downwardly facing frusto-conical bearing seat 48 engageable with the upper flange face 36. The bearing 40 is of a size to snugly fit within the upper portion of the cavity 14 in engagement with the end wall 20 of the housing 12, while the lower flange portion is of a size to snugly fit within the lower portion of the cavity 14. The lower bearing member 38 is additionally provided with a circular recess 50 adjacent the lower end thereof to define a depending annular collar or base portion 52 of a substantially smaller cross sectional dimension than the thickness of the bearing 38 adjacent the opening 42. The annular collar portion 52 is adapted to abut against a closure member 54 in the form of a stamped sheet metal disk which, in turn, engages the housing shoulder 16 and is held thereagainst by means of the lip 18 which is crimped or spun over the outer surface of the closure 54 after assembly of the parts. The closure disk 54 serves to hold the bearings 38 and 40 under slight compression and in tight engagement with the flange faces 34 and 36 and the shank portions 30 and 32.

As is well known in the art, the relay rod 10 and its housing portion 12 may be formed from steel or other suitable material. The cavity 14 is formed therein by forging or other suitable manufacturing process. The stud 24 may also be desirably made from steel and may be inexpensively formed, as by cold heading. The bearing members 38 and 40 are desirably molded from a synthetic elastomer, such as a urethane rubber composition having an additive to reduce friction, such as molybdenum disulfide, graphite, or the like. Examples of such substances are Adiprene C and Vulkollan 30, which possess great tensile strength, elasticity and resistance to wear and tear, as well as an extremely low coefficient of friction. The material may be highly compressed over long periods of time, yet will continue to retain its elasticity to maintain a tight fit between the stud and cavity. In practice, it has been found that the performance of the joint of the present invention may be enhanced somewhat by placing a drop of very fine oil on the bearing seats 46 and 48 prior to assembly of the joint, which acts as something of a "starter" for the lubricating additives embodied in the bearings 38 and 40. Other than this initial lubrication, however, no other or subsequent lubrication of the joint is necessary throughout the life thereof.

Upon attempted tilting of inclination of the stud from its normal axis, the material of the bearings 38 and 40 adjacent the apertures 42 and 44 will engage the shank portions 30 and 32, respectively, to resist such attempted movement. In addition, the bearing seats 46 and 48 will engage the flange faces 34 and 36 to resist such movement. It will be noted that the bearings 38 and 40 are so shaped that the greater portion of the material thereof, in an axial direction, is adjacent the outer diameter of the flange, where the movement of the flange is the greatest. Thus, the bearings of the joint serve a desirable function in providing a distribution of material in locations where it will do the most good in uniformly and yieldingly resisting movement of the flange 28 upon tilting or inclination thereof. It will, of course, be apparent that the shape of the stud 24 and its flange 28 and the bearings 38 and 40 permit free rotation of the stud 24 within the joint and the bearing seats 46 and 48 provide a wide distribution of the load to support such rotative movement.

The collar portion 52 of the bearing 48 serves an important function, not only in absorbing shock, but also in permitting the parts of the joint to be properly assembled, irrespective of variations in the dimension thereof. In the event that the bearings are at the upper limits of their dimensional tolerances and the cavity 14 is at the lower limit of its dimensional tolerance, the collar portion 52 may be compressed and caused to expand into the space normally left by the recess 50 to permit the closure disk 54 to be fully seated against the shoulder 16. In performing a shock absorbing function, the formation of the recess provides additional space into which the material of the collar portion 52 may be compressed. Additionally, the material of the bearing 38 immediately adjacent the central opening 42 thereof may be depressed into the space of the recess 50 upon an axial impact received by the stud 24 to additionally enhance the resiliency and the shock absorbing character of the joint. In addition to these considerations, it will be noted that the provision of the collar portion 52 permits the stud 24 to move downwardly a substantial distance before it strikes the closure disk 54. Thus, the closure member 54 can be inexpensively stamped from a perfectly flat sheet of material. It will thus be seen that the joint of the present invention provides a structure which is ideally suited for its intended function, yet which may be made from a minimum of parts, which is extremely easily assembled and which may be otherwise inexpensively fabricated.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In a flexible joint construction, a housing member formed with an open-ended cavity, a stud having a flange thereon disposed in said cavity, said flange having a pair of opposite faces disposed on radially outwardly converging planes, a pair of elastomeric bearing members disposed one in engagement with each one of said flange faces, each of said bearing members being of greater depth in a direction axially of said stud at the radially outer margin thereof, one of said bearing members having a recess on one side thereof to define an annular portion of reduced cross sectional area, and closure means for said housing engageable with said annular portion to maintain said bearing members in said housing and against which said annular portion will be compressed upon axial movement of said flange in a direction toward said closure means.

2. In a flexible joint construction, a housing member formed with a frusto-conical cavity which is open adjacent the large end thereof, said housing having an apertured end wall at the small end of said cavity, a stud having a flange spaced from one end thereof and disposed in said cavity, said flange having a pair of opposite faces lying in radially outwardly converging planes, a pair of elastomeric bearing members disposed one on each side of said flange and encircling said stud, said bearing members being in engagement with the wall defining said cavity and having bearing seat surfaces conformably engaging the respective adjacent faces of said flange, the bearing member disposed at the large end of said cavity having a recess formed in the side thereof opposite from said flange to define an annular collar portion of reduced cross sectional area, and closure means for said housing engageable with said collar portion and against which said collar portion will compress upon axial movement of said stud in a direction toward said closure means.

3. In a flexible joint construction, a housing member having a cavity, a stud having a flange thereon disposed in said cavity, a pair of elastomeric bearing members disposed one on each side of said flange, one of said bearing members having an integral annular portion of reduced lateral thickness disposed at one end of said cavity, and means at said one end of said cavity engaging and compressing said annular portion in a direction axially of said stud.

4. In a flexible joint construction, a housing member formed with a cavity having an enclosing side wall and an end wall provided with an opening therein, a stud extending through said opening and having a flange disposed in said cavity, a pair of elastomeric bearing members disposed one on each side of said flange, one of said bearing members having a recess on one side thereof defining a base portion of reduced lateral thickness lying adjacent said side wall, and means at said one end of said cavity engaging and compressing said annular portion in a direction axially of said stud.

5. In a flexible joint construction, a housing member formed with an open-ended cavity and an apertured end wall at the end thereof opposite from the open end of said cavity, a stud projecting through said aperture and having a flange disposed in said cavity, a pair of elastomeric bearing members disposed one on each side of said flange, the bearing member on the side of said flange adjacent the open end of said cavity having an annular portion of reduced lateral thickness adjacent the open end of said cavity, and a closure member for said open cavity end engaging said annular portion and compressing said annular portion in a direction axially of said stud.

6. In a flexible joint construction, a housing member formed with an open-ended cavity, a stud having a flange thereon disposed in said cavity, a pair of elastomeric bearing members disposed one on each side of said flange, the bearing member on the side of said flange adjacent the open end of said cavity having an integral collar portion of reduced lateral thickness, and a closure member for the open end of said cavity engaging and compressing said collar portion in a direction axially of said stud.

7. In a flexible joint construction, a housing member formed with a frusto-conical cavity open at the large end thereof, a stud having a laterally outwardly extending annular flange disposed in said cavity, a pair of elastomeric bearing members disposed in said cavity on opposite sides of said flange, the one of said bearing members adjacent the large end of said cavity having an integral annular portion of reduced lateral thickness adjacent the large end of said cavity, and a closure member for the open large end of said cavity engaging and compressing said annular portion in a direction axially of said stud.

References Cited in the file of this patent

UNITED STATES PATENTS

| | | |
|---|---|---|
| 1,964,432 | Geyer | June 26, 1934 |
| 2,846,251 | Herbenar | Aug. 5, 1958 |
| 2,862,742 | Long et al. | Dec. 2, 1958 |
| 2,880,026 | Moskovitz | Mar. 31, 1959 |
| 2,944,829 | Herbenar | July 12, 1960 |